UNITED STATES PATENT OFFICE.

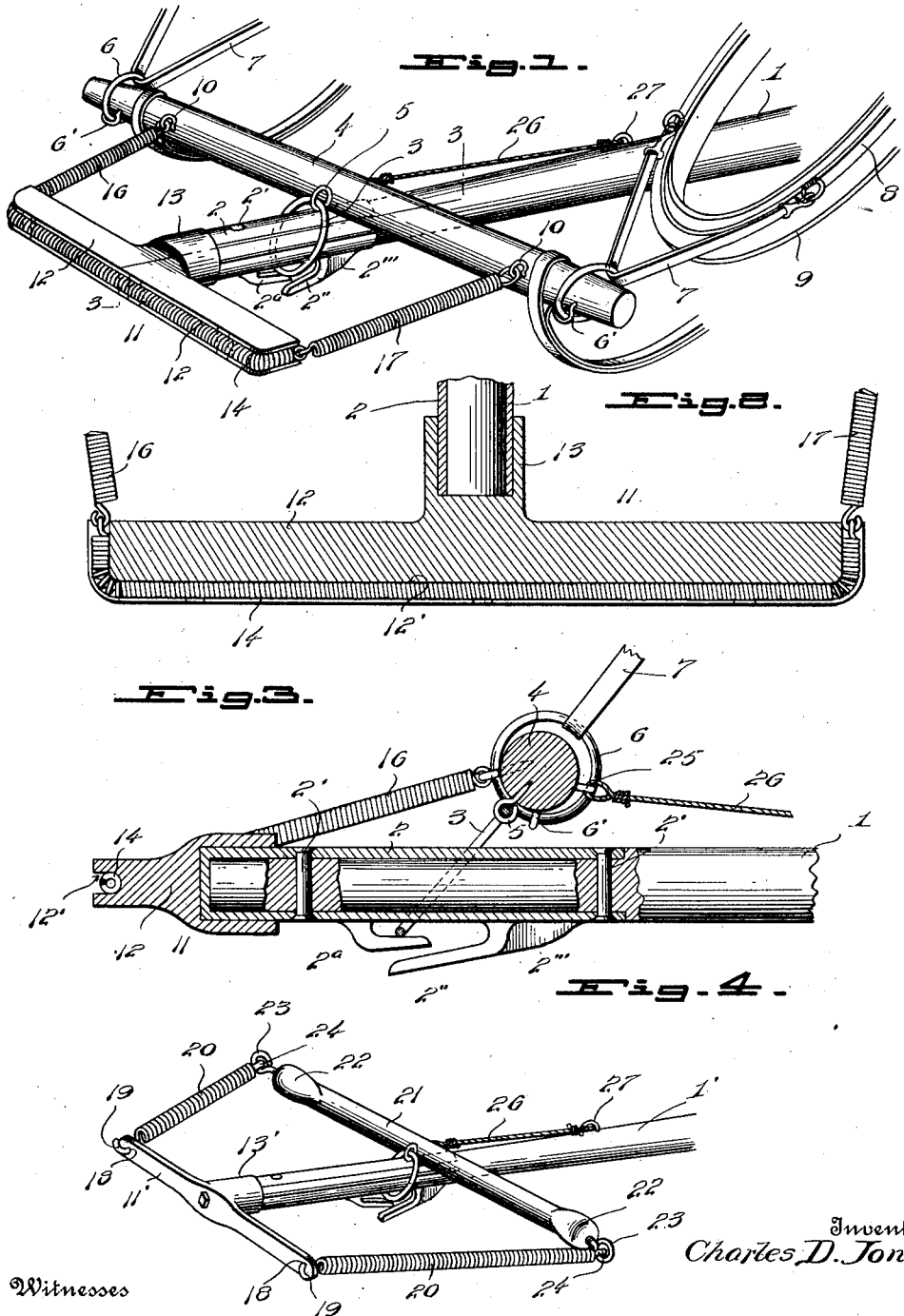

CHARLES D. JONES, OF LAKE CITY, MICHIGAN, ASSIGNOR OF ONE-HALF TO DAVID D. WALTON, OF LAKE CITY, MICHIGAN.

VEHICLE TONGUE ATTACHMENT.

1,100,572. Specification of Letters Patent. Patented June 16, 1914.

Application filed April 4, 1913. Serial No. 758,872.

*To all whom it may concern:*

Be it known that I, CHARLES D. JONES, a citizen of the United States, residing at Lake City, in the county of Missaukee and State of Michigan, have invented new and useful Improvements in Vehicle Tongue Attachments, of which the following is a specification.

The present invention relates to attachments for vehicle tongues or poles.

In carrying out my invention I propose to provide an attachment which may be easily and quickly connected to any ordinary vehicle pole and to the neck-yoke carried by the pole, and which will serve as an effective means for properly retaining the neck-yoke at a desired angle with relation to the pole as well as providing a means for preventing the reins, attached to the harness of the draft animal, from being interfered with by either the pole or neck-yoke as well as from falling below either the said pole or neck-yoke.

I also aim to provide an attachment of this character which shall embody the desirable features of simplicity of construction, cheapness in manufacture, ease in attachment and which shall effectively and accurately accomplish the purposes for which it is designed.

With the above recited objects in view, and others which will appear as the nature of the invention is more fully understood, the improvement resides in the novel construction, combination and operative arrangement of parts set forth in the following description and falling within the scope of the appended claims.

In the accompanying drawing I have illustrated a satisfactory reduction of the improvement to practice, but it is to be understood that the important instrumentalities thereof may be varied, and so I am not to be restricted to the structural details therein shown, but am entitled to such changes as fall within the scope of my claims.

In the drawing: Figure 1 is a perspective view of the improvement in applied position upon a vehicle pole and neck-yoke, Fig. 2 is an enlarged longitudinal section taken through the improvement, Fig. 3 is a sectional view taken approximately upon the line 3—3 of Fig. 1, and Fig. 4 is a perspective view of a modified form of the improvement.

Referring now to the drawing in detail, the numeral 1 designates an ordinary vehicle pole. The pole 1 is provided at its outer end with a metallic reinforcing member 2, the same comprising a substantially U-shaped body which engages with both the upper and lower faces of the pole and which is connected thereto through the medium of securing elements in the nature of bolts or rivets 2', the said securing members passing through both of the arms of the U-shaped member 2. The member 2 is provided upon its inner face with a downwardly extending angular lip 2'' that is provided with an integrally formed angularly arranged reinforcing strip or bar 2'''. The metallic member 2 naturally embodies a certain amount of resiliency, and the said member may be either integrally formed with or may be provided upon its underface with a spring hook 2ª which is arranged longitudinally of the lip 2'', but which is spaced slightly away from the said lip.

Arranged between the spring hook and the lip of the member 2 is a ring 3 which engages with an eye 5 provided upon a neck-yoke 4. The neck-yoke, in Figs. 1 and 3 of the drawing, is provided adjacent its outer ends with rings 6, which are secured to the said neck-yoke by staples 6', or the like, and the rings are adapted to receive straps 7 which are connected with the hames 8 of the harness collars 9. The neck-yoke 4 is further provided at a suitable distance from the ring 6, with eyes 10, the purpose of which will be presently described.

The numeral 11 indicates the removable member for the end of the pole 1. This member comprises a substantially rectangular element 12 which has its outer corners rounded and its outer face as well as its ends formed with a continuous groove or channel 12'. The inner face of the member 12 is centrally provided with a socket 13, the bore of which being of a size sufficient to snugly engage the end of the pole 1. Arranged within the channel 12' is a helical spring 14, the ends of which being disposed in the portions of the channel provided at the ends of the member 12, and the said ends of the spring are adapted to be engaged by separate spring members 16 and 17 respectively. These springs 16 and 17 have their ends formed with hooks which engage with the eyes 10 of the neck yoke 4. By such a construction it will be noted that the resilient members or springs 16 and 17 provide means for sustaining the member 11 upon the end of the pole, and also serve to equalize the strain upon the neck-yoke and to retain the said neck-yoke normally in a plane parallel to the plane of the portion 12 of the member 11. The spring 14 may have its main or body portion, or rather that portion disposed within the longitudinal channel upon the outer face of the member 12 secured therein in any desired or preferred manner, or the said outer portion of the channel may be closed at intervals as indicated by the dotted lines in Fig. 1 of the drawing, or, if desired, the spring 14 may be disassociated from the member 11.

In Fig. 4 of the drawing, the member 11' is provided with a socket 13' which engages with the outer end of the pole 1'. The member 11' comprises a flat substantially rectangular element, the socket 13' being arranged upon one of its faces and disposed medially of the said element. The ends of the member 11' are formed with openings 18 for the reception of the end convolutions 19 of spring members 20.

The numeral 21 designates the neck yoke which is removably connected to the pole 1', the said yoke having its opposite ends formed with knob-shaped enlargements 22, the said enlargements having their outer faces provided with eyes 23 which are adapted to receive the hook ends 24 provided upon the springs 20.

In the devices illustrated in all of the figures of the drawing, the neck-yokes 4 and 21 are centrally provided with eyes 25 which are adapted to receive a cord or strap 26 that has its opposite end attached to the poles 1 and 1' at 27. This cord is adapted to limit the movement of the neck-yoke toward the outer end of the pole, the said yoke being normally influenced to a movement in such a direction by the resilient elements 16 and 17, and 20.

From the above description, taken in connection with the drawings, the simplicity of the device, as well as the advantages thereof, will, it is thought, be apparent to those skilled in the art to which such inventions appertain without further detailed description.

Having thus described the invention, what is claimed as new is:

1. The combination with a vehicle pole and a neck-yoke loosely secured thereto, of a member having a centrally arranged socket adapted to be positioned upon the end of a pole, a spring member attached to each of the ends of the said socket member, said springs being also secured adjacent the ends of the neck-yoke, and a flexible connection between the pole and the rear face of the neck-yoke.

2. The combination with a vehicle pole and a neck-yoke loosely connected therewith, of a substantially rectangular member having its outer face and its ends formed with a continuous channel, a helical spring arranged within the channel and having its ends provided with eyes, a socket medially arranged upon the rear face of the rectangular member and adapted to be inserted over the end of the pole, and spring members connected with the eyes of the first mentioned spring and attached to the neck-yoke.

3. The combination with a vehicle pole having its end provided with a metallic reinforcing member, the said member including a lip arranged upon the underface of the member and a spring hook co-acting with the lip, a ring arranged between the lip and hook, a neck-yoke medially connected with the ring, a strap connecting the neck-yoke with the pole, and spring members removably connected to the ends of the neck-yoke and with the end of the pole.

4. The combination with a vehicle pole having its end provided with a U-shaped member, the said member having its lower face formed with an angularly arranged outwardly extending lip, and having a rearwardly extending resilient hook engaging with the lip, a ring between the hook and lip, a neck-yoke loosely connected with the ring, said yoke having its ends provided with eyes, said yoke having its rear face centrally provided with an eye, a flexible element connected with the eye and secured to the upper face of the pole, a removable member centrally connected with the pole, and removable spring members connected with the said member and with the eyes at the ends of the neck-yoke.

In testimony whereof I affix my signature in presence of two witnesses.

CHARLES D. JONES.

Witnesses:
  Geo. W. Wood,
  T. E. Steffe.

---

Copies of this patent may be obtained for five cents each, by addressing the "Commissioner of Patents, Washington, D. C."